(12) United States Patent
Gaulier et al.

(10) Patent No.: US 10,443,651 B2
(45) Date of Patent: Oct. 15, 2019

(54) HYDRODYNAMIC BEARING

(71) Applicant: FLENDER-GRAFFENSTADEN S.A.S., Illkirch-Graffenstaden (FR)

(72) Inventors: Thomas Gaulier, Wolfisheim (FR); Pierre Hamy, Strasbourg (FR); Eric Jallat, Illkirch-Graffenstaden (FR)

(73) Assignee: Flender-Graffenstaden S.A.S., Illkirch-Graffenstaden (FR)

( * ) Notice: Subject to any disclaimer, the term of this patent is extended or adjusted under 35 U.S.C. 154(b) by 0 days.

(21) Appl. No.: 15/781,225

(22) PCT Filed: Sep. 22, 2016

(86) PCT No.: PCT/EP2016/072494
§ 371 (c)(1),
(2) Date: Jun. 4, 2018

(87) PCT Pub. No.: WO2017/092903
PCT Pub. Date: Jun. 8, 2017

(65) Prior Publication Data
US 2018/0355916 A1 Dec. 13, 2018

(30) Foreign Application Priority Data
Dec. 3, 2015 (EP) .................................... 15290299

(51) Int. Cl.
*F16C 17/02* (2006.01)
*F16C 33/10* (2006.01)
(Continued)

(52) U.S. Cl.
CPC .......... *F16C 33/1055* (2013.01); *F16C 17/02* (2013.01); *F16C 32/0659* (2013.01);
(Continued)

(58) Field of Classification Search
CPC ...... F16C 17/02; F16C 17/022; F16C 17/028; F16C 33/1055; F16C 33/103;
(Continued)

(56) References Cited

U.S. PATENT DOCUMENTS 1,940,301 A * 12/1933 Grobel ................. F16C 23/045
384/291
2,901,297 A * 8/1959 Sternlicht ............. F16C 17/028
384/291
(Continued)

FOREIGN PATENT DOCUMENTS

CN 1232740 C 12/2005
CN 1777761 A 5/2006
(Continued)

*Primary Examiner* — Marcus Charles
(74) *Attorney, Agent, or Firm* — Laurence A. Greenberg; Werner H. Stemer; Ralph E. Locher

(57) ABSTRACT

A hydrodynamic bearing includes an annular inner surface surrounding a rotary shaft to support and guide rotation thereof about the longitudinal rotation axis thereof in an upstream to downstream rotation direction. The inner surface includes an orifice for supplying lubricant and first and second discharge recesses distributed on either side of the supply orifice according to the width of the bearing. The first discharge recess opens into a first side groove and the second discharge recess opens into a second side groove. The first and second side grooves extend along a portion of the circumference of the bearing on lateral sides of the inner surface of the bearing, from the respective first and second discharge recesses towards a third discharge recess located downstream of the two recesses, to direct the lubricant collected by the first and second discharge recesses towards the third recess to be discharged outside the bearing.

12 Claims, 7 Drawing Sheets

(51) Int. Cl.
*F16C 32/06* (2006.01)
*F16C 37/00* (2006.01)

(52) U.S. Cl.
CPC ...... *F16C 32/0685* (2013.01); *F16C 33/1065* (2013.01); *F16C 33/1075* (2013.01); *F16C 33/1085* (2013.01); *F16C 37/002* (2013.01); *F16C 2361/61* (2013.01)

(58) Field of Classification Search
CPC .............. F16C 33/1065; F16C 33/1075; F16C 33/108; F16C 33/1085; F16C 32/0651; F16C 32/0659; F16C 32/0685; F16C 37/002; F16C 2361/61; F16C 2360/24
USPC ....... 384/100, 120, 129, 283, 286, 316, 321, 384/900
See application file for complete search history.

(56) References Cited

U.S. PATENT DOCUMENTS

| | | | |
|---|---|---|---|
| 3,945,692 A | 3/1976 | Tsujiuchi | |
| 4,961,122 A | 10/1990 | Sakai et al. | |
| 5,480,234 A * | 1/1996 | Chen | F16C 33/1065 384/313 |
| 6,485,182 B2 * | 11/2002 | Nicholas | F16C 17/03 384/117 |
| 6,547,438 B2 * | 4/2003 | Shima | F16C 32/0651 384/100 |
| 6,935,786 B2 * | 8/2005 | Hirano | F16C 32/0651 384/118 |
| 7,641,392 B2 | 1/2010 | Fuerst et al. | |
| 8,646,979 B2 * | 2/2014 | Kashchenevsky | F16C 33/1075 384/114 |
| 8,770,842 B2 | 7/2014 | Nomura et al. | |
| 9,279,453 B2 * | 3/2016 | Laubender | F16C 17/02 |
| 9,284,976 B2 * | 3/2016 | Blair | F16C 17/028 |
| 9,410,572 B2 * | 8/2016 | Shoup | F16C 17/028 |
| 2002/0018604 A1 | 2/2002 | Weissbacher | |
| 2007/0075601 A1 | 4/2007 | Shiraki | |
| 2008/0304776 A1 | 12/2008 | Asada et al. | |

FOREIGN PATENT DOCUMENTS

| | | | |
|---|---|---|---|
| CN | 1940321 A | 4/2007 | |
| CN | 101432534 A | 5/2009 | |
| CN | 103026086 A | 4/2013 | |
| CN | 103233978 A | 8/2013 | |
| DE | 2628918 A1 * | 1/1978 | .......... F16C 33/1075 |
| DE | 10030698 A1 * | 1/2002 | .............. F16C 17/02 |
| EP | 1298335 A2 | 4/2003 | |
| FR | 2249260 A1 | 5/1975 | |
| GB | 2062129 A | 5/1981 | |
| WO | 9835166 A1 | 8/1998 | |

* cited by examiner

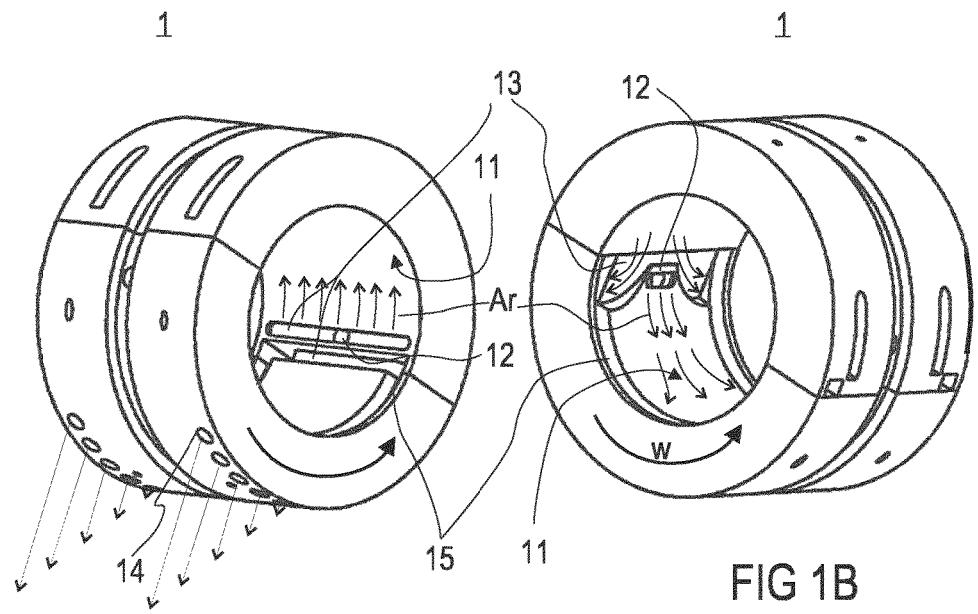
FIG 1A
FIG 1B
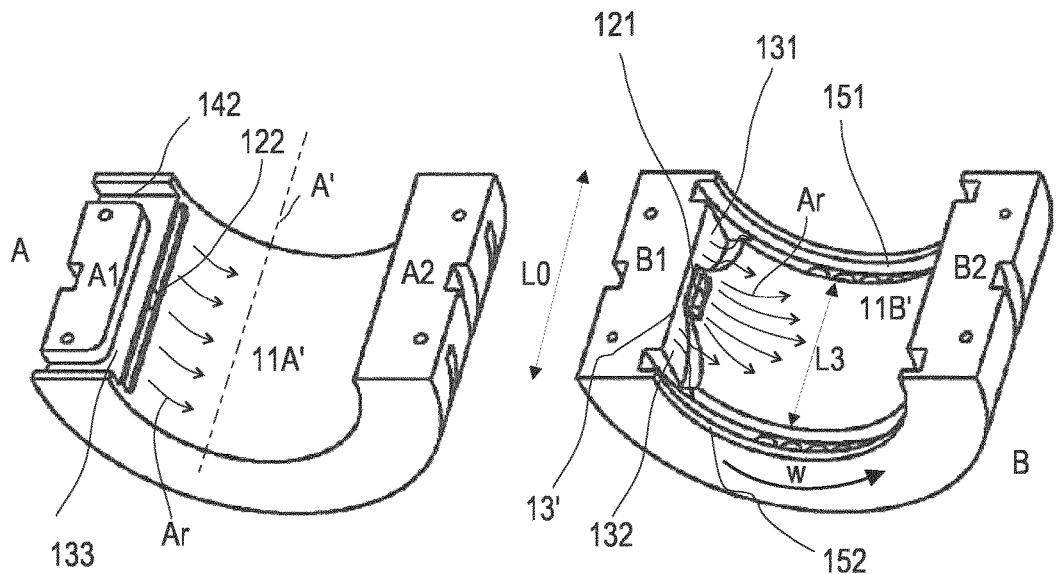
FIG 1C
FIG 1D

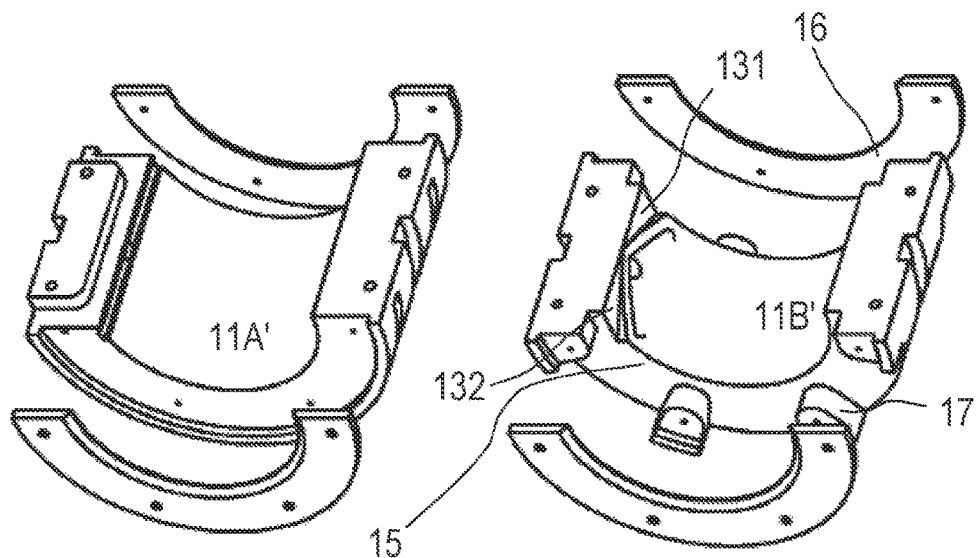
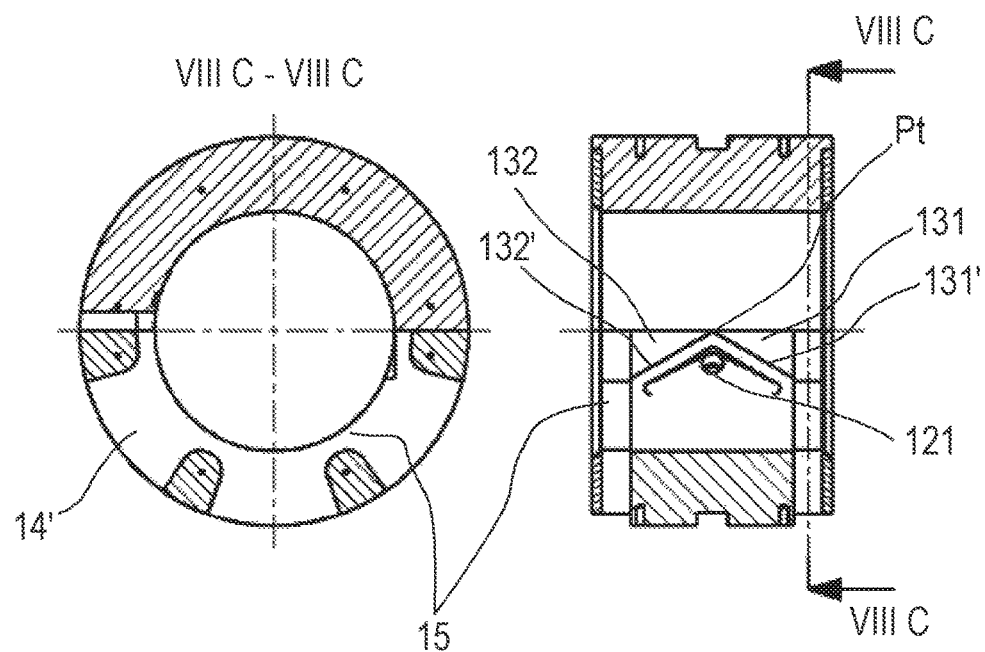

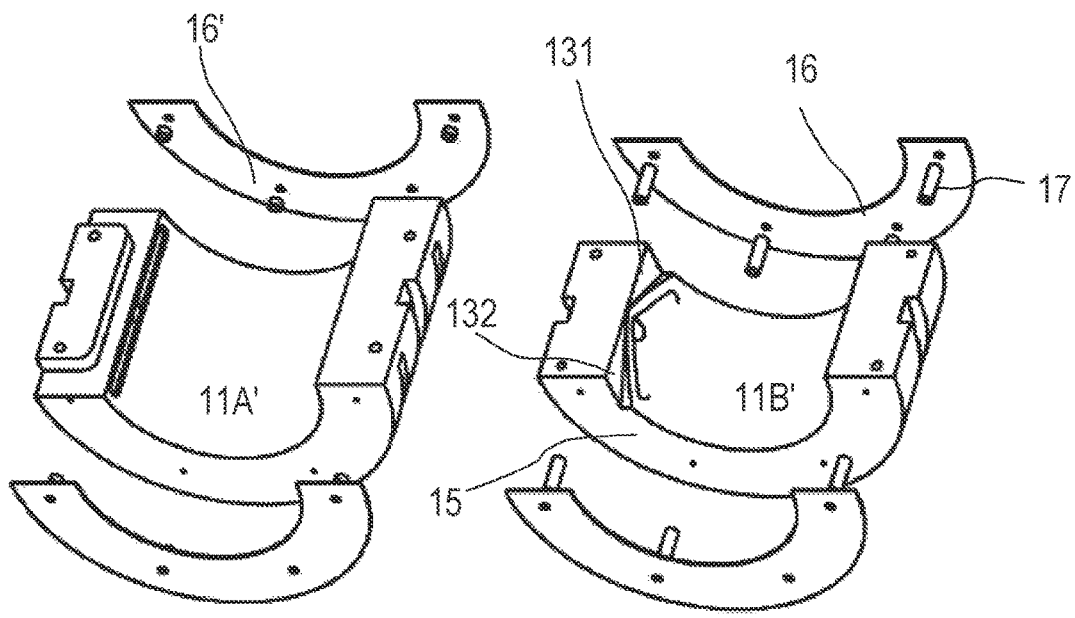
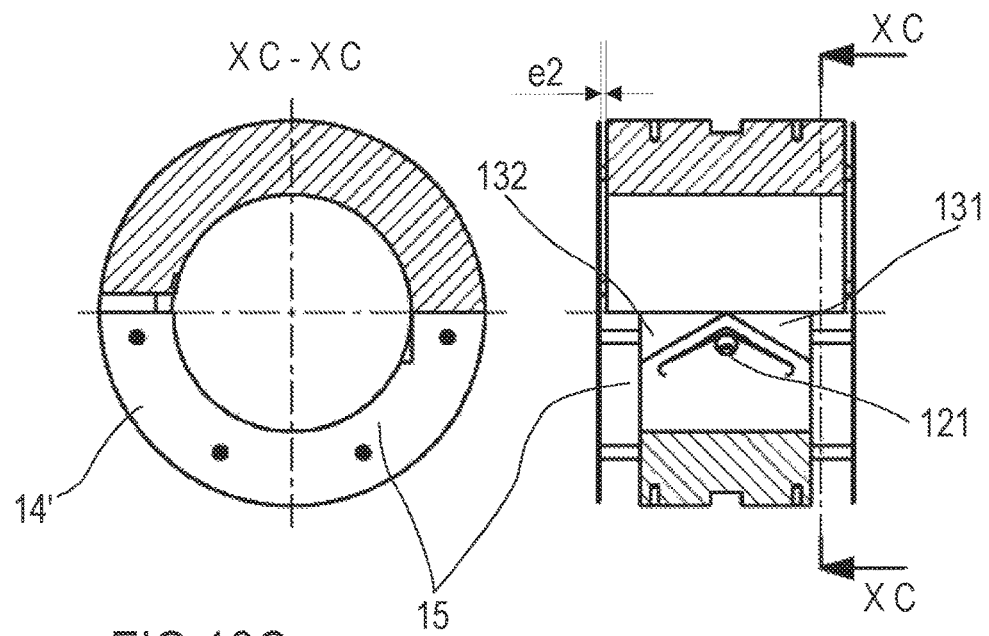

HYDRODYNAMIC BEARING

CROSS-REFERENCE TO RELATED APPLICATION

This application is a continuation, under 35 U.S.C. § 120, of International Application PCT/EP2016/072494, filed Sep. 22, 2016, which designated the United States; this application also claims the priority, under 35 U.S.C. § 119, of European Patent Application EP 15 29 0299.5, filed Dec. 3, 2015; the prior applications are herewith incorporated by reference in their entirety.

BACKGROUND OF THE INVENTION

Field of the Invention

The present invention relates to a hydrodynamic bearing having an annular inner surface for surrounding a rotor or rotary shaft in order to support and guide the rotation of the rotor or rotary shaft about the longitudinal axis of rotation thereof in an upstream to downstream direction of rotation.

The present invention relates notably to hydrodynamic bearings that are able to carry a rotor or rotary shaft and to guide same in rotation, such as the bearings commonly used to bear high-speed/high-power rotary shafts (reduction gear or step-up gear) for the gas and oil energy market. The bearings according to the invention are particularly suited for use with high radial loads and high shaft speeds.

Such a bearing is for example described in patent application US 2002/0018604 A1. Such a bearing is typically in the form of a hollow cylinder comprising one or more cylindrical lobes, the inner cylindrical portion of said bearing being arranged to receive a rotary shaft, for example the rotary shaft of a pinion of a reduction gear, such as to carry said shaft and guide same in rotation, said inner cylindrical portion also having a sliding surface and a fluid supply device designed to allow the lubrication of a gap separating the outer surface of the rotary shaft of said sliding surface and the formation of a lubricating film between the outer surface of said shaft and said sliding surface when said shaft is rotated at a rotational speed greater than a maximum speed defined by the dimensioning of the bearing and the shaft, said lubricant (for example, the viscosity thereof), the geometry and the forces acting on the bearing-shaft system.

The basic principle of the hydrodynamic bearing is to have a lubricating film interposed between the shaft and the reamed surface of the bearing (i.e. the surface of the inner cylindrical portion of said bearing forming the sliding surface for said shaft), said film enabling said shaft to rotate without contact with said reamed surface from said maximum speed.

Unfortunately, the hydrodynamic bearings known by the person skilled in the art and suitable for high loads and high speeds, such as the bearing described above, suffer from the following problems:
  loss of power by friction,
  recirculation of hot lubricant,
  excessive consumption of lubricant, requiring an over-dimensioning of the cooling circuit for said lubricant in order to prevent overheating of said bearing when in use,
  instabilities at one or more rotational speeds of said shaft, notably as a result of an imbalance between the damping and stiffness matrices of the bearing-shaft system,
  an axial flow of lubricant in a direction substantially aligned with the longitudinal axis of rotation of said rotor, said flow further increasing the losses caused by spray from the gears located close to said bearing.

SUMMARY OF THE INVENTION

One purpose of the present invention is to propose a new type of hydrodynamic bearing that helps to reduce power losses caused by friction, lubricant consumption, instabilities and said lubricant flow, notably an axial lubricant flow, and to reduce losses caused by spray from gears.

For this purpose, a hydrodynamic bearing has an inner surface including:
  a lubricant supply orifice, and
  a first discharge recess and a second discharge recess, distributed on either side of the supply orifice across the width of the bearing, the first discharge recess opening into a first side groove and the second discharge recess opening into a second side groove so as to respectively guide the lubricant downstream away from the first side groove and the second side groove,
  the first side groove and the second side groove extending along a portion of the circumference of the bearing on the lateral sides of the inner surface of the bearing, from the respective first discharge recess and second discharge recess toward a third discharge recess located downstream, in order to direct the lubricant collected by the first and second discharge recesses toward the third discharge recess so as to be discharged to the outside of the bearing.

A set of sub-claims also sets out advantageous embodiments of said bearing according to the invention.

The present invention thus notably relates to a hydrodynamic bearing comprising an annular inner surface, i.e. a cylindrical surface, of width L0, that is arranged to surround a rotary shaft in order to support the latter and to guide the rotation of same about the longitudinal axis of rotation thereof in an "upstream" to "downstream" direction of rotation w, said inner surface comprising:
  a lubricant supply orifice for supplying lubricant to the inner surface of said bearing, said supply orifice being preferably centered in relation to the width L0 of said inner surface, said supply orifice ending in the direction of said inner surface in an opening, this opening being preferably longilinear of length L1<L0 extending longitudinally in a direction parallel to said longitudinal axis of rotation, said opening being bordered at one end and across the width of said bearing by a first discharge recess and at the other end and across said width by a second discharge recess, the opening of said supply orifice toward said inner surface being in particular located at the base of a symmetrical "V" pointing in the opposite direction to the direction of rotation w, and each arm of same extending downstream and preferably symmetrically from said opening (i.e. in said direction of rotation w) toward one of the lateral sides of said inner surface such as to provide an upstream limit for said first discharge recess and said second discharge recess,
  said first and second discharge recesses, each designed to recover the lubricant moving downstream during rotation of said shaft and to direct or guide same toward a first side groove and a second side groove respectively, said side grooves being designed to prevent an axial flow of lubricant out of the bearing and being able to collect an axial flow leaving said inner surface and to direct same to be discharged radially. The first discharge recess is for example designed to direct said lubricant along one arm of said "V" toward the first lubricant collection side groove, and said second discharge recess is designed to direct said lubricant along the other arm of said "V" toward the second lubricant collection side groove. Said first discharge recess and said second discharge recess according to the invention thus each describe a hollow path in the body of the bearing that is open toward the first side groove and the second side groove respectively, as well as being open radially toward said longitudinal axis of rotation such that the lubricant driven in rotation in the direction of rotation w "falls" into said path created by said first and second discharge recesses and is directed from the portion of the first discharge recess adjoining said opening of said orifice downstream toward the first side groove, and from the portion of the second discharge recess adjoining said opening of said orifice downstream toward the second side groove.

Said lubricant supply orifice according to the invention is thus in particular bordered on each side along the width of said inner surface, for example on each of the longitudinal ends of the opening thereof on the inner surface, by a discharge recess, the first and second discharge recesses respectively, enabling recovery of at least some of the lubricant moving downstream in relation to the supply orifice and/or to said discharge recesses in order to guide same downstream and to discharge same laterally via the first side groove and the second side groove respectively. Said first discharge recess is preferably arranged on one side of said opening of said orifice and said second discharge recess is arranged on the other side of said opening across said width of the inner surface, each discharge recess for example having a side parallel to a lateral side of said inner surface, and another side perpendicular to said lateral side, i.e. parallel to said longitudinal axis of rotation, said recovery recesses being in particular arranged symmetrically in relation to said opening of said orifice. Preferably, the width of the first and second discharge recesses measured from said parallel side, i.e. the width in a direction parallel to said longitudinal axis, decreases in the direction of rotation w, i.e. in a downstream direction, and the depth of each of said discharge recesses increases in said direction of rotation w. In other words, the depth of said path created by each of said discharge recesses increases from the upstream and to the downstream end of same. In particular, the depth of said discharge recesses where same open onto the respective side grooves, for example at each of the ends of the arms of said "V", is equal to or less than the depth of said lubricant collection side grooves. Indeed and in particular, said parallel side of each of said discharge recesses opens onto one of said side grooves, the parallel side of said first discharge recess thus opening onto the first side groove and the parallel side of said second discharge recess opening onto the second side groove. Advantageously, said discharge recesses surrounding said opening of said lubricant supply orifice make it possible to stabilize the shaft at high rotational speeds and to direct the lubricant toward said side grooves, thereby reducing or eliminating an axial flow of lubricant out of said bearing, said lubricant being forced to follow the path defined by said first and second discharge recesses, then said first and second side grooves. Thus, according to the present invention, the axial flow out of the bearing is prevented by capturing the lubricant no longer used to form the hydrodynamic film using said discharge recesses and directing this latter from said recesses to the respective side grooves, said first side groove and second side groove, each of said side grooves bordering one of the lateral sides of said inner surface such that the first side groove is able to collect the lubricant recovered by said first discharge recess and the second side groove is able to collect the lubricant recovered by said second discharge recess. Preferably, each of the grooves has a hollow semi-circle shape in said bearing and extends along the internal lateral edges of said bearing around a portion of the internal circumference of said bearing, for example 180°. In particular, the first side groove links said first discharge recess to a third discharge recess located downstream in relation to said first discharge recess, and said second side groove links said second discharge recess to said third discharge recess. Preferably, said first groove and said second groove each have at least one radial opening, for example a radial bore, that is designed to be arranged beneath said shaft when said bearing is mounted about said shaft, and that is designed to discharge the lubricant collected in the groove radially to the outside of said bearing, for example toward a circulation system of said lubricant, said third discharge recess, which is for example longilinear, preferably connected to said side grooves and also notably has one or more radial bores designed to discharge said lubricant collected in said grooves to the outside of said bearing, said inner surface also includes, downstream of said third discharge recess, another lubricant supply orifice, said other orifice being preferably centered in relation to the width of said inner surface and opening out toward said inner surface by means of an opening, that is for example longilinear and of length L2>L1 and extends longitudinally in a direction parallel to said longitudinal axis of rotation, said inner surface being smooth and free of recesses between said other lubricant supply orifice and said first and second lubricant discharge recesses.

BRIEF DESCRIPTION OF THE SEVERAL VIEWS OF THE DRAWING

Advantages of said bearing according to the invention and example embodiments and applications are provided using the following figures:

FIGS. 1A-1D 3D view of a preferred embodiment of a hydrodynamic bearing according to the invention.

FIGS. 8-10 Different views of other embodiments of a bearing according to the invention, in which FIG. 8C is taken along the plane VIII C-VIII C in FIG. 8D, FIG. 10C is taken along the plane X C-X C in FIG. 10D.

DESCRIPTION OF THE INVENTION

Figure 2:
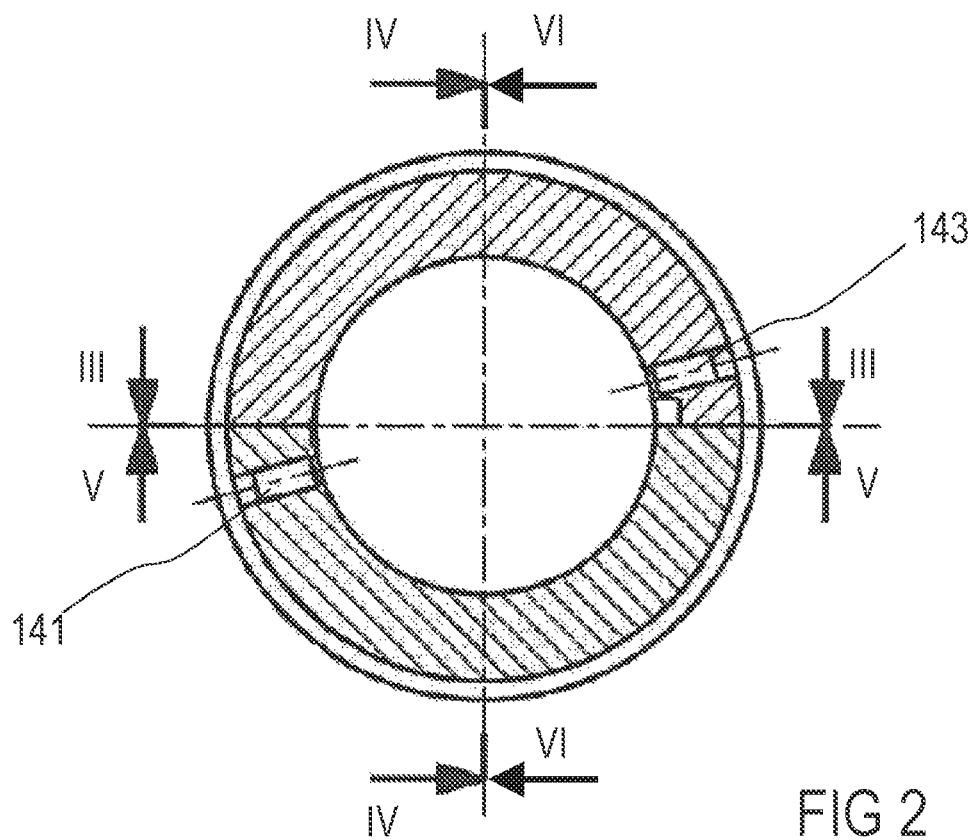
FIG. 2 Median cross section of the bearing according to FIG. 1.

FIG. 1 is a three-dimensional (3D) schematic representation of a preferred embodiment of a hydrodynamic bearing 1 according to the invention. FIGS. 1A and 1B are side views of said bearing 1. This latter has an annular body about an axial direction represented by the axis A' (see FIG. 1C), or in other words said body of said bearing 1 is a hollow cylinder arranged to surround a rotary shaft (not shown) having a longitudinal axis of rotation that is designed to be arranged in said axial direction at the center of said annular body. In particular, said longitudinal axis of rotation and said axis A' extend substantially in the same direction. Said bearing 1 is non-rotatably fixed and is designed to facilitate a rotation of said shaft in the direction of rotation w, as indicated by the corresponding arrows in FIGS. 1A and 1B. The direction of rotation w is oriented in a downstream direction.

Said annular body has an inner surface 11 that acts as guide and support for said rotary shaft when same is rotating in the direction of rotation w. Said inner surface is the cylindrical surface located on the inside of said bearing and acts notably as the sliding surface for said shaft. This inner surface 11 is reamed such as to have lubricant supply orifices 12, discharge recesses 13, radial bores or openings 14, and side grooves 15, as explained below. The directions followed by the lubricant over the inner surface 11 of said bearing are shown schematically by the arrows Ar in FIGS. 1A-1D.

Figure 7:
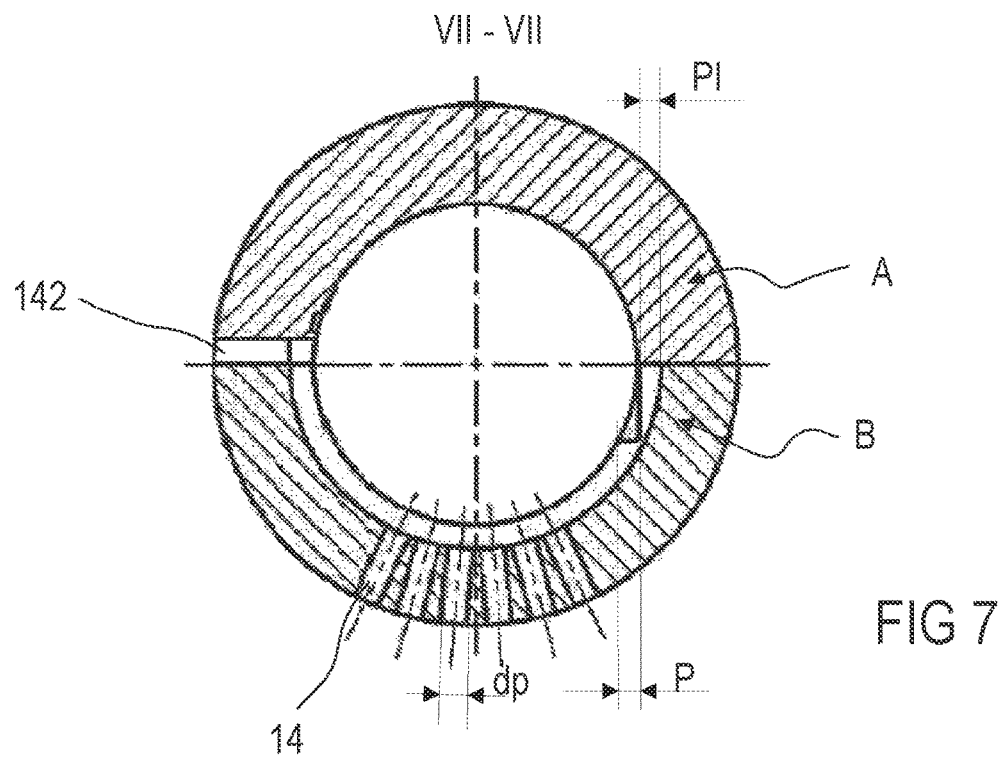
FIG. 7 Cross section of the bearing according to FIG. 6 taken along the plane VII-VII.

In particular and as shown in FIGS. 1C and 1D, said bearing preferably comprises two portions or lobes in the form of hollow semi-cylinders, respectively an "active lobe A" and a "passive lobe B", which are designed to be assembled together, for example to be fitted together, to form said bearing 1. Said active lobe A and said passive lobe B are respectively designed to be positioned above and below (see FIG. 7) said shaft when said bearing 1 surrounds the latter. In general, said bearing according to the invention includes at least one active lobe and one or more passive lobes. The active lobe, as defined in the field of bearings, is notably the cylindrical portion of the bearing that absorbs most of the load or force generated during rotation of said shaft when the bearing is carrying said shaft and said shaft is in rotation.

The inner surface of the active lobe A of said bearing is designed to withstand the forces, notably the vertical upward forces, transmitted by the shaft during rotation of same. The inner surface of the passive lobe B is notably designed to collect the lubricant laterally in the side grooves 15 and to discharge same by gravity or pumping via the radial openings 14. The width of the inner surface according to the invention is in particular L3 and less than the width L0 of said bearing, such as to reduce the drag forces of the bearing. Preferably, the first side groove 151 and the second side groove 152 are respectively characterized by a width L4 and L5, for example L4=L5, calculated such as to create minimum resistance to the flow of lubricant while enabling a radial orientation of said flow in order to discharge the lubricant out of said bearing.

Figure 3:
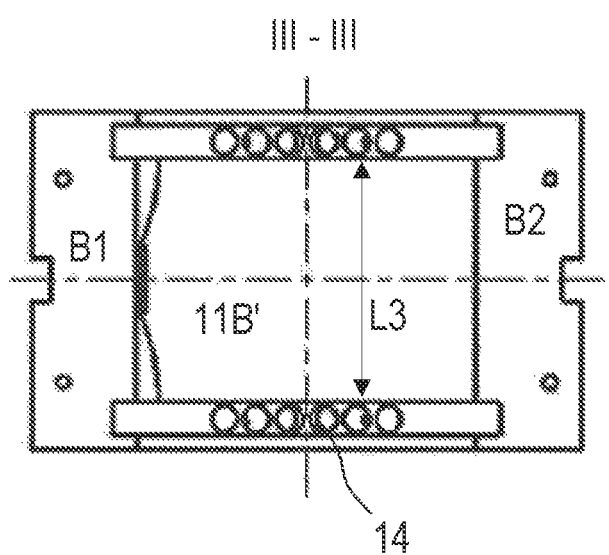
FIG. 3 Cross section of the bearing according to FIG. 2 taken along the plane III-III.
Figure 4:
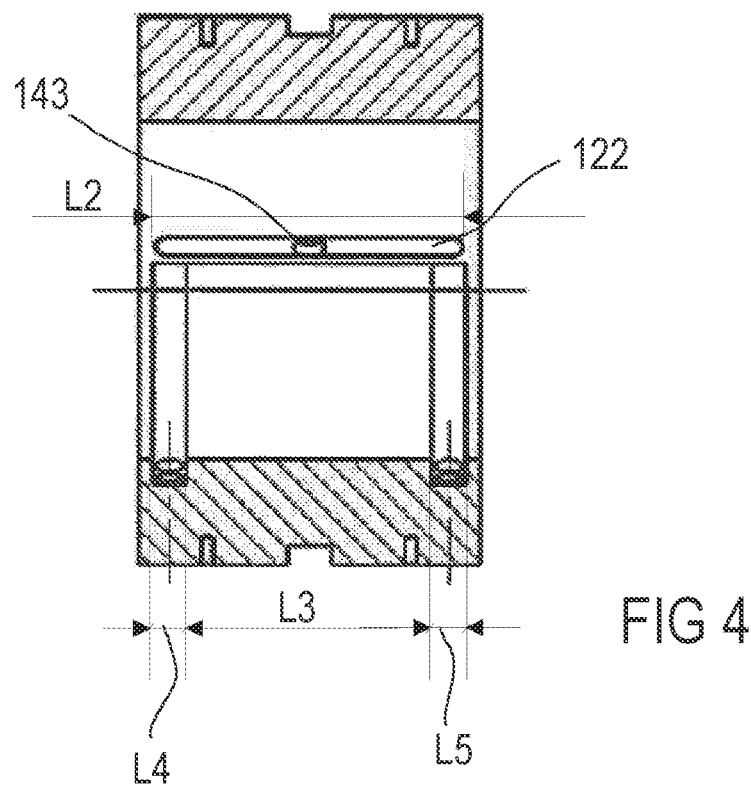
FIG. 4 Cross section of the bearing according to FIG. 2 taken along the plane IV-IV.
Figure 5:
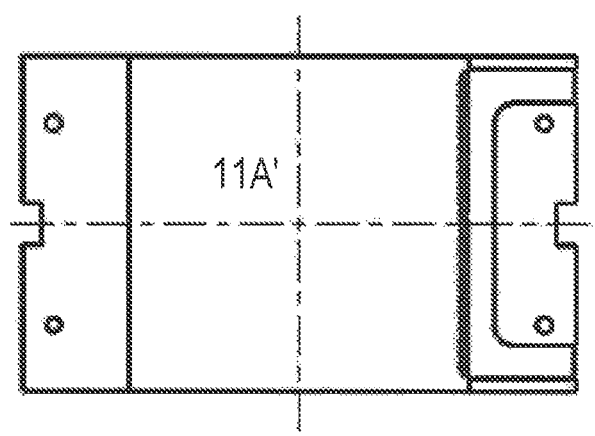
FIG. 5 Cross section of the bearing according to FIG. 2 taken along the plane V-V.
Figure 6:
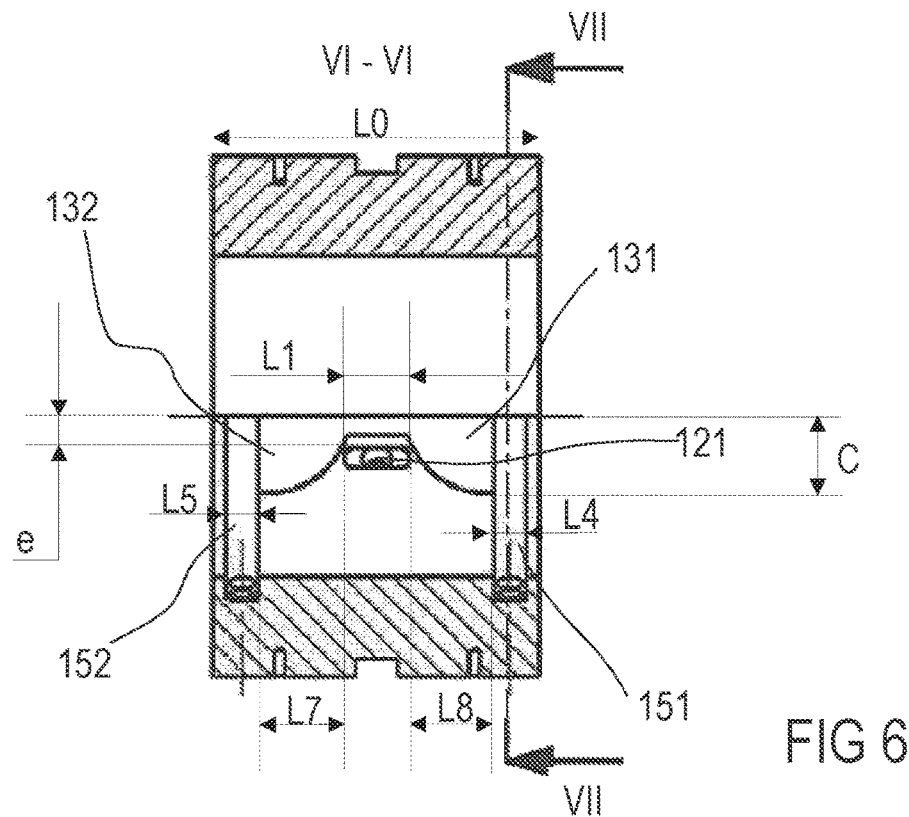
FIG. 6 Cross section of the bearing according to FIG. 2 taken along the plane VI-VI.

Around the circumference of said inner surface 11 of said bearing 1 in the direction of rotation w, notably starting said path at the end B1 (see FIG. 1D and FIG. 3) of said passive lobe and following said inner surface toward the end B2 (see FIG. 1D or FIG. 3), said inner surface 1 has, and therefore in particular the inner surface of said passive lobe B has:

- a lubricant supply orifice 121 (see also FIG. 6) that is centered in relation to the width L0 of said bearing and opens out at said inner surface 11 by means of an opening of length L1 across the width of said bearing and less than L3, said orifice 121 enabling the inner surface of said bearing to be supplied with lubricant via a channel 141 passing through said bearing 1 from the outside to the inside as shown in FIG. 2, said channel 141 notably opening out in said opening that is preferably rectilinear and longilinear, said opening being arranged along the width L0 of said bearing. Preferably, a space e (see FIG. 6) separates said opening of said orifice 121 from the end B1 of said passive lobe B. This space e is in particular minimized to limit the circulation of lubricant from the active lobe to the non-active lobe, e having values typically between 2 mm and 10 mm for a bearing with an internal diameter of 200 mm. The example dimensions given in the remainder of the document are provided for said bearing with an internal diameter of 200 mm.
- a first discharge recess 131 and a second discharge recess 132 border said opening of said orifice 121 on either side of the width of said bearing 1. Said discharge recesses 131 and 132 can be linked by a longitudinal depression positioned upstream of the orifice 121, in said space e separating said opening of said orifice 121 from the end B1 of said passive lobe B. In particular, the depth P of said recesses 131 and 132 increases further away from the end B1, i.e. increases in the downstream direction until the depth thereof is less than or equal to the side grooves 15. Preferably, the first discharge recess 131 and the second discharge recess 132 have a side parallel to a lateral side of the inner surface 11, said parallel side having a length C that is calculated such as to facilitate flows in the side grooves 151 and 152 without excessively reducing the developed length of the non-active lobe B. Typically, the value of C is between 40 mm and 50 mm. In particular, the first discharge recess 131 and the second discharge recess 132 have a depth P at the end B1, for example P=0 mm, that increases, for example linearly, until same is equal to or less than the depth P1 of the side grooves 151 and 152, or in other words the line segment 13' shown in FIG. 1D is level with or set back from (i.e. at the same radial distance from the longitudinal axis of rotation or at a greater radial distance) the surfaces 11A' of the active lobe A or 11B' of the passive lobe B. The first discharge recess 131 and the second discharge recess 132 are preferably distributed symmetrically on either side of the opening of said lubricant supply orifice 121 such that the width L6 of the first discharge recess 131 at said opening of said orifice 121 is equal to the width L7 of the second discharge recess 132 at said opening of said orifice 121, where L6>L1. The first discharge recess 131 extends notably from a longitudinal end of the opening of said orifice 121 toward the closest side groove, referred to as the "first side groove 151", opening onto said first side groove 151, and respectively the second discharge recess 132 extends from the other longitudinal end of the opening of said orifice 121 toward the closest side groove, referred to as the "second side groove 152", opening onto said second side groove 152, each one describing a downstream angle from the respective longitudinal ends of the opening of said orifice 121 and in relation to said axial direction, in order to direct the lubricant arriving from upstream toward respectively the first side groove 151 and the second side groove 152, on either side of said opening. In other words, the first discharge recess 151 and the second discharge recess 152 are able to recover lubricant arriving from upstream and to direct same downstream, such as to laterally direct same in the respective side grooves,
- the first side groove 151 and the second side groove 152, extending downstream from said first discharge recess 131 and said second discharge recess respectively, toward a third discharge recess 133, said side grooves being designed to collect the lubricant arriving in said first discharge recess 131 and said second discharge recess respectively, in order to direct same to the outside of said bearing, either via the radial openings, for example the radial bores 14 (see FIG. 7) of diameter dp, of which there is a number n distributed beneath the shaft when the bearing surrounds the latter, where typically dp=12 to 20 mm and n=2 to 6, or via said third discharge recess 133 located downstream and having one or more discharge channels 142 (see FIGS. 2, 5 and 7) that are designed to discharge said lubricant from the inside of said bearing to the outside, the dimensions of one of said channels being typically 10 to 15 mm (diameter for a channel of circular section) or 45 to 70 mm×10 to 15 mm (length×width for a channel of rectangular section). As shown in FIGS. 1C and 1D, the side grooves 15 are each arranged laterally on a portion of the internal circumference of said bearing. Preferably, the first side groove 151 and the second side groove 152 extend from the end B1 to the end B2 of said passive lobe B and for example have a rectangular section. In particular, said active lobe A has, at one of the ends A1 thereof that is designed to fit with or to be attached to the end B2, said third discharge recess 133 and the discharge channel or channels 142, said third discharge recess 133 preferably extends longitudinally from the first groove 151 to the second groove 152, the total length thereof along the width of said bearing being L3+L4+L5, and includes said discharge channel or channels 142, which are notably designed to radially discharge said lubricant to the outside of said bearing. Said third discharge recess 133 is in particular longilinear and preferably the same length as or longer than another lubricant supply orifice 122, said other lubricant supply orifice 122 is arranged directly downstream of said third discharge recess 133 and opens out at the inner surface 11 via an opening that is preferably longilinear extending longitudinally along the width of said bearing, the length L2 of said opening being greater than the length L1 of the opening of the orifice 121, said length L2 being for example equal to the distance separating the lateral side of the first groove 151 that is furthest away from the second groove 152 from the lateral side of the second groove 152 that is furthest away from the first groove 151, this distance being for example equal to the length of said third discharge recess 133. Said other orifice 122 also has a supply channel 143 designed to enable lubricant to enter said bearing from the outside of said bearing, such as to lubricate said inner surface of said bearing. Preferably, said inner surface has no recesses between said other orifice 122 and said first and second discharge recesses 131, 132, i.e. between said other orifice 122 and the end B1 of the passive lobe B. Thus, according to the present invention, the active lobe A in particular includes said third discharge recess 133 with the discharge channel or channels 142 thereof arranged at the end A1 of said active lobe, then, further downstream, said other orifice 122, arranged beside said third discharge recess 133, preferably leaving a longitudinal space E between said third discharge recess 133 and said other orifice 122, then further downstream from said other orifice 122 as far as the other end A2 of said active lobe A, the inner surface 11A' with no recesses across the entire width of said bearing, said other end A2 being designed to be attached and/or fitted to the end B1 of said passive lobe B.

Figures 9A, 9B:
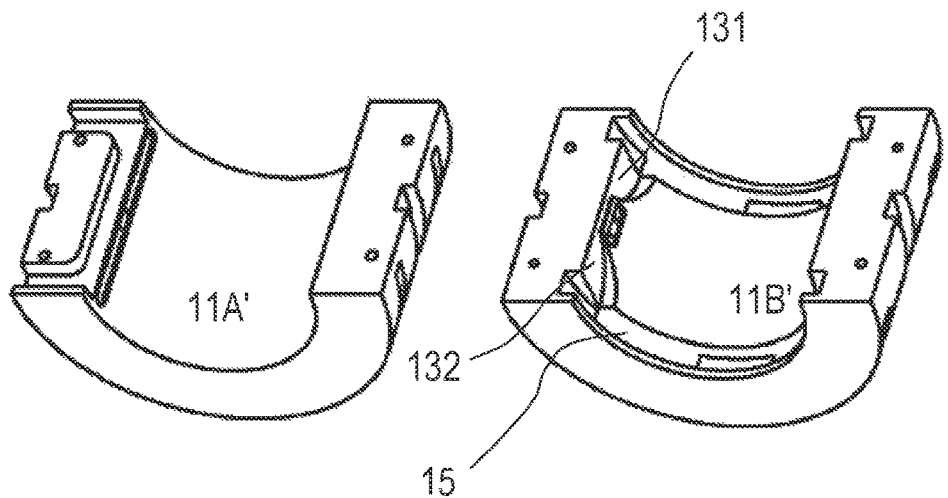
Figures 9C, 9D:
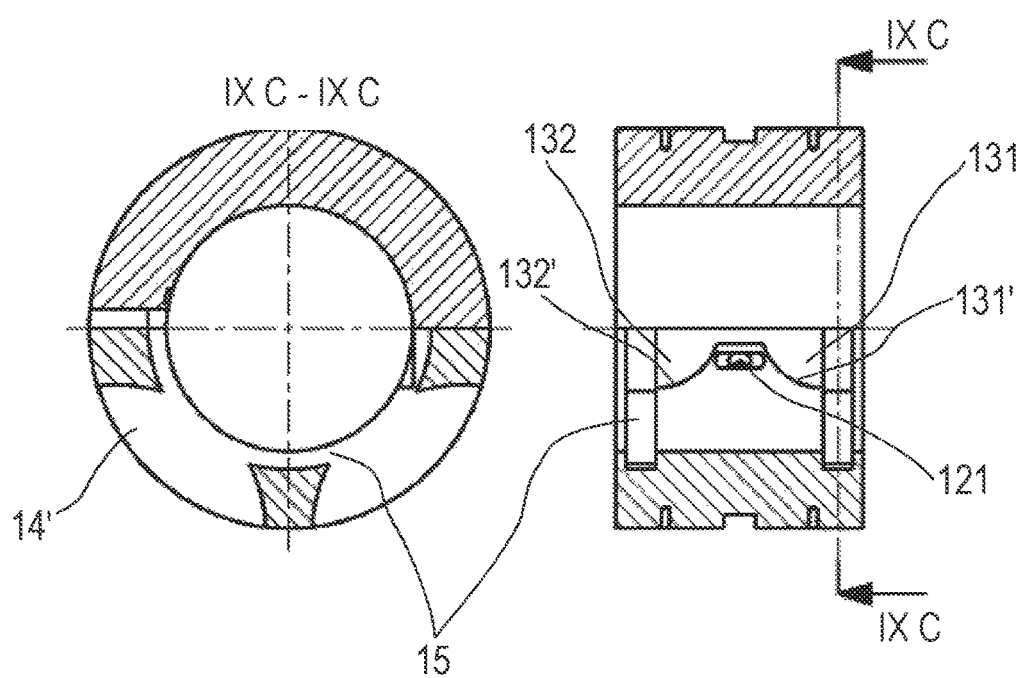
FIG. 9C is taken along the plane IX C-IX C in FIG. 9D

FIGS. 8-10 show structural variations of the bearing according to the invention, FIGS. 8A-8D show a bearing according to a first embodiment of the invention, FIGS. 9A-9D show a bearing according to a second embodiment of the invention, and FIGS. 10A-10D show a bearing according to a third embodiment of the invention. In general, a bearing according to the invention can combine the characteristics of the four different bearings shown in FIGS. 1, 8, 9 and 10.

In particular, the side grooves 15 can be made in different ways, as shown in FIGS. 8-10. A first embodiment as described above effectively involves hollowing out said side grooves from the body of said bearing of width L0, as shown in FIGS. 1D, 9B, 9C and 9D. However, said side grooves can also be created by attaching a plate 16 to each lateral side of said passive lobe B of said bearing, parallel to the lateral sides of said passive lobe B, respectively at a distance L4 from one lateral side of the passive lobe B in order to form the side groove 151 and at a distance L5 from the other lateral side of the passive lobe B in order to form the side groove 152, said plate 16 being a circle sector with an internal diameter equal to the radial distance separating the inner surface 11 (for example 11A' or 11B') from said axis A' (i.e. equal to the internal diameter of said bearing) and the external diameter is substantially equal to the external diameter of said bearing. In this case, the width of the passive lobe B is L3 and the width L0 of the bearing is given by $L0=L3+L4+L5+2 \cdot e1$, where e1 is the thickness of each of said plates in the form of a circle sector. In particular, a free space between the attachment means 17 used to attach said plates to the lateral sides of the passive lobe enables a radial flow of the lubricant and can thus perform the function of said radial bores 14, or replace same. Optionally, such plates can also be attached to each lateral side of the active lobe A maintaining a separation distance e2 (see FIG. 10D) between the lateral sides of the active lobe and each of said plates in order to recover an axial flow of lubricant leaving the inner surface 11A' of said active lobe. The plates designed to be fitted to the active lobe of said bearing are notably shown in FIG. 10A and indicated using reference sign 16'. In this case and in particular, the separation distance e2 separating the plate from the lateral side of the active lobe is less than L4 or L5.

The radial bores 14 can in particular be radial openings 14' reamed in the body of said bearing, enabling communication between each side groove and the outside of said bearing (see FIG. 9C), or formed by attaching said plates 16 to the lateral sides of said active lobe, as shown in FIGS. 8C and 10C. Said openings 14' can be of different shapes and sizes to efficiently discharge the lubricant recovered in said side grooves to the outside of said bearing, as shown in FIGS. 8-10.

The geometric configuration of the discharge recesses 131, 132 and of the supply orifice 121 can also be formed in different ways. For example, said discharge recesses 131 and 132 include respectively a guide stop 131' and 132' that is rectilinear (see FIG. 8D) or curved (see FIG. 9D), said guide stop 131', 132' in particular linking the downstream end of the parallel side of the recess to an end that is substantially central (in relation to the width of the bearing) of the perpendicular side thereof. Preferably, if the discharge recesses 131, 132 each have a rectilinear guide stop 131', 132', these latter join together at a point Pt at the midpoint of the width of the bearing to form an inverted "V" (see FIG.

8D), the supply orifice 121 being at the base of said "V" formed by the stops, and more specifically aligned with and downstream of said point Pt.

In conclusion, the present invention proposes a new type of hydrodynamic bearing including discharge recesses 131, 132 cooperating with a supply orifice 121, said discharge recesses being designed to divert a flow of lubricant toward side grooves or slots 15 such that the lubricant heated during the work of said shaft by rotation is guided by said recesses, then by said side grooves to be discharged outside the bearing, while enabling fresh lubricant to be provided via said supply orifice 121.

The invention claimed is:

1. A hydrodynamic bearing, comprising:
an annular inner surface configured to surround, support and guide a rotation of a rotary shaft about a longitudinal axis of rotation of the rotary shaft in an upstream to downstream direction of rotation, said annular inner surface including:
a lubricant supply orifice;
a first discharge recess and a second discharge recess formed on opposite sides of said supply orifice across a width of the bearing, said first discharge recess opening into a first side groove and said second discharge recess opening into a second side groove for respectively guiding the lubricant downstream away from said first side groove and said second side groove; and
said first side groove and said second side groove extending along a portion of a circumference of the bearing on lateral sides of said annular inner surface of the bearing from said first discharge recess and said second discharge recess respectively toward a third discharge recess located downstream, for directing the lubricant collected by said first and second discharge recesses toward said third discharge recess to be discharged outside the bearing.

2. The bearing according to claim 1, wherein said first side groove and said second side groove each have at least one radial opening configured to radially discharge the lubricant from inside said first and second side grooves to outside the bearing.

3. The bearing according to claim 1, wherein said first discharge recess and said second discharge recess have depths increasing in the downstream direction.

4. The bearing according to claim 3, wherein said first and second side grooves have depths, and said depths of said first and second discharge recesses increase in the downstream direction, starting upstream and level with said annular inner surface and increasing downstream to a depth equal to or less said depths of said first and second side grooves.

5. The bearing according to claim 1, wherein said first discharge recess and said second discharge recess are configured to recover the lubricant conveyed downstream by the rotation of the shaft, and to direct the recovered lubricant laterally and downstream respectively toward said first side groove and said second side groove.

6. The bearing according to claim 1, wherein said third discharge recess has at least one discharge channel to radially discharge the lubricant collected by said side grooves to outside the bearing.

7. The bearing according to claim 1, which further comprises another lubricant supply orifice located downstream of said third discharge recess.

8. The bearing according to claim 7, wherein said third discharge recess adjoins said other lubricant supply orifice.

9. The bearing according to claim 7, wherein said annular inner surface is smooth and free of recesses between said other lubricant supply orifice and said first and second discharge recesses.

10. The bearing according to claim 1, which further comprises an active bearing lobe and a passive bearing lobe each having a hollow semi-cylinder shape, said lobes being attachable to one another to form the bearing.

11. The bearing according to claim 10, wherein:
said passive bearing lobe has one end, another end and an inner circumference;
said first and second discharge recesses and said lubricant supply orifice are disposed at said one end of said passive bearing lobe; and
said side grooves each extend sideways from said one end of said passive bearing lobe to said other end of said passive bearing lobe around said inner circumference of said passive lobe.

12. The bearing according to claim 11, wherein said active bearing lobe has ends, and said third discharge recess is disposed at one of said ends of said active bearing lobe and is configured to be attached to said other end of said passive bearing lobe.

* * * * *